H. DEVLIN.
TRANSMISSION MECHANISM.
APPLICATION FILED FEB. 2, 1912.

1,091,487.

Patented Mar. 31, 1914.
2 SHEETS—SHEET 1.

Witnesses
Chas. W. Stauffiger.
Anna M. Dorr

Inventor
Henry Devlin,
By
Attorneys

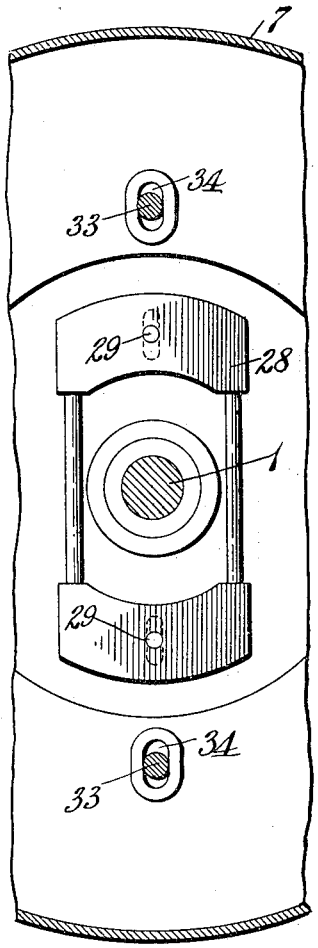
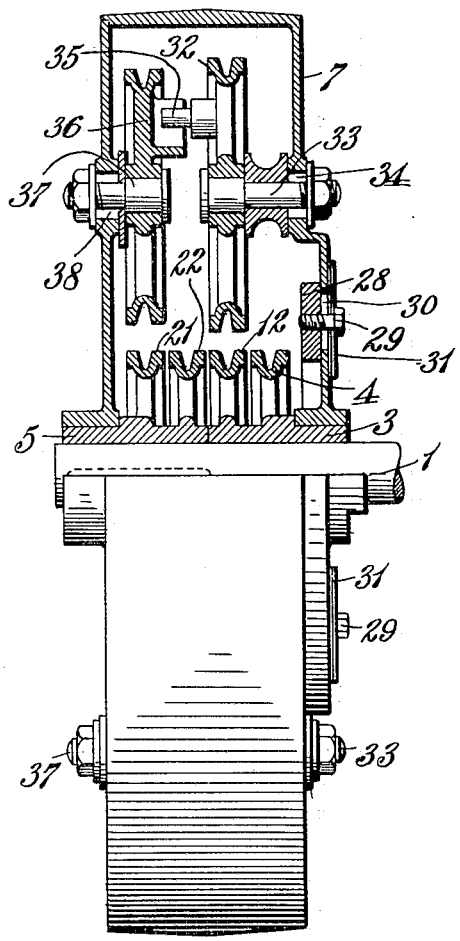

UNITED STATES PATENT OFFICE.

HENRY DEVLIN, OF BAY CITY, MICHIGAN, ASSIGNOR TO THE M. GARLAND COMPANY, OF BAY CITY, MICHIGAN, A CORPORATION OF MICHIGAN.

TRANSMISSION MECHANISM.

1,091,487.   Specification of Letters Patent.   Patented Mar. 31, 1914.

Application filed February 2, 1912.   Serial No. 674,878.

*To all whom it may concern:*

Be it known that I, HENRY DEVLIN, a citizen of the United States of America, residing at Bay City, in the county of Bay and State of Michigan, have invented certain new and useful Improvements in Transmission Mechanism, of which the following is a specification, reference being had therein to the accompanying drawings.

This invention relates to speed reduction transmission mechanism for imparting any desired speed to a shaft from a source of power and more especially to an arrangement thereof whereby mechanism, which is of a type to rotate with the shaft, is adjustable to take up wear and whereby provision is made for balancing the mechanism to compensate for any variation of the adjustment.

The invention consists in the matters hereinafter set forth, and more particularly pointed out in the appended claims.

Figure 1:
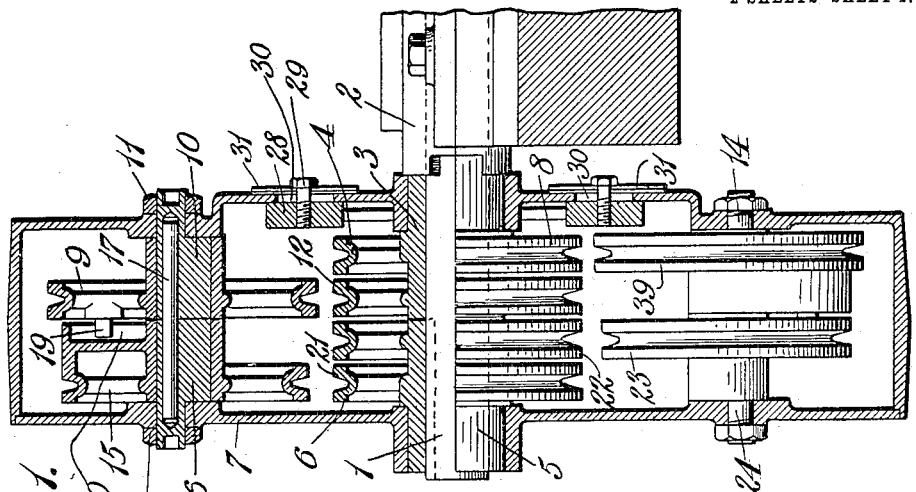
Figure 2:
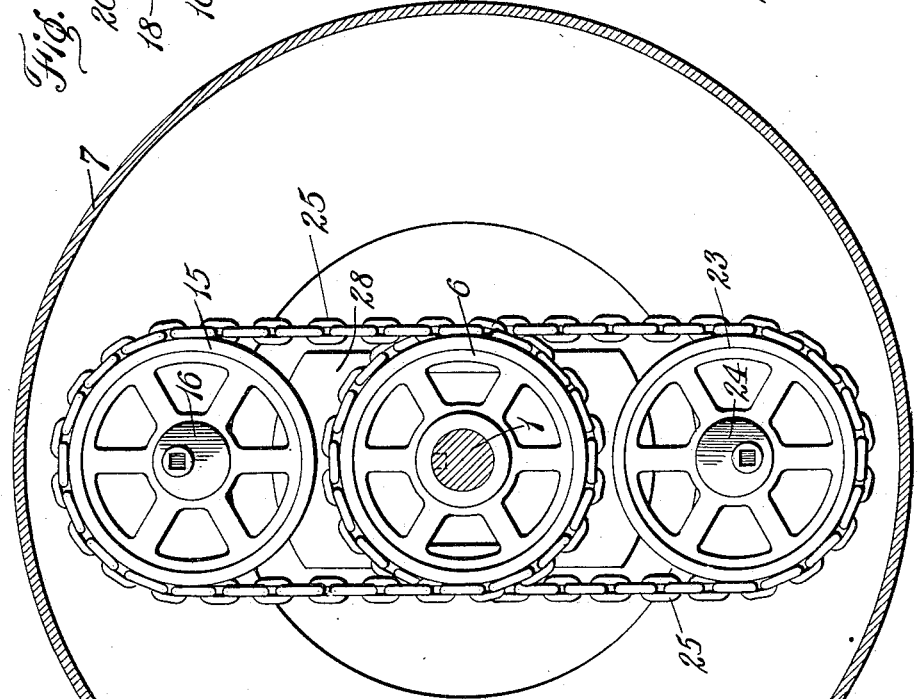

In the drawings, Figure 1 is a view in section of one form of mechanism that embodies features of the invention; Fig. 2 is a view in side elevation thereof; Fig. 3 is a view in section of a modification of the device showing another means of adjustment; and Fig. 4 is a view in detail of an adjustable counterbalance.

As shown in the drawings, a shaft 1 that is to be driven at reduced speed is mounted in a fixed bearing 2 that is adapted to engage at one end with the hub 3 of a wheel 4 rotatable on the shaft, and thereby hold the wheel stationary as regards the shaft. The hub 5 of a drive wheel 6 that is secured to the shaft adjacent the pinion 4, forms with the hub 3 a bearing on which a main driving member 7 is rotatable, the latter constituting a casing that houses the wheels. The wheel 4 has one member 8 that is alined with an intermediate planetary wheel 9. The latter is journaled on a stud 10 that revolves around the shaft 1, the stud being eccentrically adjustable in the casing 7 with a jam nut 11 adapted to lock it in position. Another member 12 of the wheel 4 is alined with the planetary wheel 39 mounted on the stud 14 eccentrically adjustable in the same way as the stud 10 and diametrically opposite thereto. A second planetary wheel 15 is journaled on an eccentrically adjustably bearing stud 16 held in axial alinement with the stud 10 by a center pin 17 and provided with a jam or lock nut 18 securing it in adjusted position. A pin 19, projection or other interlocking member on the wheel 9 enters a slot indicated at 20 in the wheel 15 to cause the wheels 9 and 15 to turn together. The wheel 15 is alined with a member 21 of the wheel 6 and a second member 22 of the latter is alined with another planetary wheel 23 mounted on a stud 24 similar in adjustment to the stud 16 and alined with the stud 14. The alined members of the wheels are operatively coupled by endless flexible connections of any preferred type, such, for example, as the chains shown at 25, the peripheries of the wheels being appropriately formed to receive such connections.

A counterbalance 28 is adjustably secured within the casing 7 as by cap screws 29 passing through radial slots 30 and clamping against suitable washers or plates 31. The counter weight is shifted as desired to compensate for the shifting of the several parts of the mechanism when the latter is adjusted to compensate for wear.

The means for independently adjusting the wheels may be as shown in Fig. 3 wherein a pair of planetary wheels 32 are mounted each diametrically opposite studs 33 which are adjustable in radial slots 34 of the casing 7. Each of said wheels is loosely connected by a suitable projection or pin 35 to a second wheel 36 mounted on a stud 37 adjustable in a radial slot 38.

In operation, the casing is turned by application of power to its periphery as by a belt or other form of drive. This carries planetary wheels around the fixed wheels and causes the former to rotate in reverse direction to the casing. Consequently, the second steps of the planetary wheel drive the drive wheel which is secured to the shaft at a rate of speed proportionate to the relative sizes of the interconnected wheels and in a direction of rotation that is also dependent upon the proportionate diameters. As the wheels are independently adjustable any wear may be taken care of and the balance is preserved by a corresponding shifting of the counterbalance weight. Thus the driven shaft is not subjected to any undue strain and the operation of the transmission is practically noiseless as there is no slack or play in the running parts.

Obviously, changes in the details of construction may be made without departing from the spirit of the invention and I do not care to limit myself to any particular form or arrangement of parts.

I claim:—

1. Transmission mechanism comprising a shaft, a drive wheel secured to the shaft, a wheel journaled on the shaft, a driving member rotatable concentrically with the driving wheel and shaft, a planetary wheel journaled on the driving member to revolve in the plane of the drive wheel and adjustably secured to change its center of motion, a planetary wheel journaled on the driving member to revolve concentrically around the wheel journaled on the shaft and adjustably secured to the driving member to change its center of motion, the planetary wheels being adapted to interlock regardless of their adjustment on the driving member to turn in unison, flexible driving connections between the planetary wheels and the companion drive and shaft wheels, and means for locking the wheel that is journaled on the shaft from turning.

2. Transmission mechanism comprising a shaft, a drive wheel secured to the shaft, a wheel journaled on the shaft, a driving member rotatable concentrically with the driving wheel and shaft, a planetary wheel adjustably journaled on the driving member to revolve in the plane of the drive wheel, a planetary wheel adjustably journaled on the driving member to revolve in the plane of the wheel journaled on the shaft, flexible driving connections between each planetary wheel and the companion drive wheel and shaft wheel, means for locking the wheel journaled on the shaft from turning, and a counterbalance for the planetary wheels and the driving connections thereof adjustably secured on the driving member, the planetary wheels being interlocked to turn together regardless of the relative independent adjustments of the latter on the driving member.

3. Transmission mechanism comprising a shaft, a drive wheel secured thereto and provided with members, a wheel journaled on the shaft, means for locking the latter wheel from turning, a driving member rotatable concentrically with the drive and shaft wheel, symmetrically disposed planetary wheels independently adjustable on the driving member, each revoluble in a plane of a member of the drive wheel, symmetrically disposed planetary wheels independently and adjustably mounted on the driving member each revoluble in the plane of a member of the wheel that is rotatable on the shaft, the adjacent pairs of planetary wheels being loosely interlocked to rotate in unison regardless of their different adjustments, and a counterweight to the planetary wheels adjustably secured on the driving member.

4. Transmission mechanism comprising a shaft, a drive wheel secured thereto, a wheel journaled on the shaft, means for locking the latter wheel from turning, a driving member rotatable concentrically with the drive and shaft wheels, symmetrically disposed planetary wheels independently adjustable on the driving member, each revoluble in the plane of a member of the drive wheel, symmetrically disposed planetary wheels independently and adjustably secured on the driving member each revoluble in the plane of a member of the wheel journaled on the shaft, the adjacent planetary wheels being interlocked to rotate together regardless of their independent adjustment, flexible driving connections between the several members of the drive and shaft wheels and the companion planetary wheels, the adjustment of the planetary wheels providing for taking up the slack of such connections, and a counterweight on the driving member for the planetary wheels.

5. Transmission mechanism comprising a shaft, a wheel rotatable thereon, a drive wheel secured to the shaft, bearing hubs on these wheels, a driving member rotatable on the bearing hubs concentrically with the wheels which it houses, means for locking the wheel journaled on the shaft from rotating, both drive and journaled wheels being formed of spaced members, a planetary wheel for each member of these wheels adjustably secured in the driving member to revolve in the plane of a companion member, the adjacent planetary wheels being adapted to interlock to rotate together regardless of their independent adjustment, endless flexible driving connections between the member and the companion planetary wheels, the adjustment of the planetary wheels providing for taking up slack in the several flexible connections, and a counterbalance on the drive member for the planetary wheels and the drive connections thereof.

6. Transmission mechanism comprising a shaft, a wheel journaled thereon, a drive wheel secured to the shaft adjacent the journaled wheel, means for locking the journaled wheel from turning, a driving member rotatable concentrically with the drive and journaled wheels, bearing studs eccentrically adjustable in the driving member to rotate in the planes of the journaled and drive wheels, planetary wheels each rotatable on a bearing stud in the plane of the adjacent wheel on the shaft, the adjacent planetary wheels being interlocked to turn together regardless of the adjustment of their respective bearing studs, flexible driving connections between the planetary wheels and the companion wheels on the shaft, and an adjustable counterbalance on the drive member for the planetary wheels and the driving connections thereof.

In testimony whereof I affix my signature in presence of two witnesses.

HENRY DEVLIN.

Witnesses:
HAROLD CATES,
HARRISON W. GARLAND.

Copies of this patent may be obtained for five cents each, by addressing the "Commissioner of Patents, Washington, D. C."